United States Patent

Salbaum et al.

Patent Number: 6,125,410
Date of Patent: Sep. 26, 2000

[54] D.M.A. CONTROLLER THAT DETERMINES WHETHER THE MODE OF OPERATION AS EITHER INTERRUPT OR D.M.A. VIA SINGLE CONTROL LINE

[75] Inventors: Helmut Salbaum, Georgensgmünd; Harald Bauer, Nürnberg; Friedrich Frühwald, Heroldsbach, all of Germany

[73] Assignee: U.S. Philips Corporation, New York, N.Y.

[21] Appl. No.: 09/104,492

[22] Filed: Jun. 25, 1998

[30] Foreign Application Priority Data

Aug. 2, 1997 [DE] Germany .......................... 197 33 527

[51] Int. Cl.[7] .................................................. G06F 13/28
[52] U.S. Cl. ............................... 710/22; 710/33; 710/47; 710/50; 710/101
[58] Field of Search .................................. 710/22, 23, 28, 710/50, 101, 33, 47; 364/238, 242, 240

[56] References Cited

U.S. PATENT DOCUMENTS

| | | | |
|---|---|---|---|
| 4,458,313 | 7/1984 | Suzuki et al. | 710/23 |
| 4,837,677 | 6/1989 | Burrus, Jr. et al. | 710/101 |
| 5,063,498 | 11/1991 | Hirahara et al. | 710/50 |
| 5,481,678 | 1/1996 | Kondo et al. | 710/101 |
| 5,535,417 | 7/1996 | Baji et al. | 710/22 |

*Primary Examiner*—Thomas C. Lee
*Assistant Examiner*—Tammara Peyton
*Attorney, Agent, or Firm*—Dicran Halajian

[57] ABSTRACT

The invention discloses a communication system for exchanging data between a bus and at least one coupled data processing arrangement via a serial interface which is coupled to a microprocessor by a control line via a DMA unit. For effecting an efficient data exchange between a bus and a serial interface by means of a DMA unit while the controlling microprocessor is slightly loaded, the DMA unit, while in an active state featuring an interrupt mode, is provided for transferring an interface control signal to the microprocessor by the control line and, while in an inactive state featuring a DMA mode, is provided for forming at least one DMA control signal from the interface control signal and for transferring the formed DMA control signals to the microprocessor by the control line. For utilizing a serial interface for a data exchange both in the interrupt mode and in the DMA mode, the control line is looped through by the DMA unit. In the DMA mode, the DMA unit is interleaved with the control line and changes the interface control signals. The control signals directly transferred in the interrupt mode are interpreted and assigned to DMA signals which are then applied to the microprocessor instead.

12 Claims, 3 Drawing Sheets

D.M.A. CONTROLLER THAT DETERMINES WHETHER THE MODE OF OPERATION AS EITHER INTERRUPT OR D.M.A. VIA SINGLE CONTROL LINE

FIELD OF THE INVENTION

The invention relates to a communication system for exchanging data between a bus and at least one coupled data processing arrangement via a serial interface which is coupled to a microprocessor by a control line via a DMA unit.

Furthermore, the invention relates to a DMA unit for both a mobile radio and a data processing device (for example a personal computer) comprising such a communication system.

BACKGROUND OF THE INVENTION

From EP 0 422 776 is known a communication system for serial data exchange which comprises a microprocessor, a memory, a DMA unit (Direct Memory Access Control unit DMAC) and a serial interface (Serial Communication Control SCC). These function blocks are interconnected as shown in FIG. 3 by data bus (column 4, lines 6–26). In FIG. 3 with associated description (column 8, line 41 to column 9, line 12) is described how the data (Communication Line 318) are received from the interface (SCC). Subsequently, under the control of the DMAC, the address information and the message contents of the data packets are written at a fixed memory location in a memory via the data bus (310). In this phase, the interface (SCC) does not supply control signals to the microprocessor via the DMA unit (DMAC). The DMA unit (DMAC) controls the transmission of the data packets from the interface (SCC) to the memory, without a check of the operation and thus a possibility of reacting to deviations from normal operation (column 8, lines 41–47). The DMAC supplies a HOLD signal to the microprocessor only at the end of a data packet to request for a check via the data bus once the SCC signals a request (column 8, lines 51–57) via a line (Request Line 33).

Since the described communication system has no control line from the interface to the microprocessor, this serial interface cannot be operated in the conventional interrupt mode. As a result, the data exchange is always to take place in the DMA mode, in which the DMA unit controls transmission to the memory. Furthermore, without control signals, the interface cannot carry out an accurate check of the data exchange (reception/transmission and storage), so that particularly when there is a deviation from the error-free operation, considerable software expenditure is necessary for correcting measures. In an interrupt mode, the interface directly informs the microprocessor of a data exchange by sending an interrupt signal. This conventional way of controlling the data exchange, however, implies a considerable load of the microprocessor and on the data bus which, as a result, can then render considerably less capacity available for other tasks (for example, the control of further interfaces). For certain data (for example, with the exchange of small data sequences such as control data), this mode, however, is more efficient than the DMA mode in which the direct check is lacking during storage.

SUMMARY OF THE INVENTION

It is an object of the invention to provide a communication system which guarantees an efficient data exchange between a bus and a serial interface by means of a DMA unit while the controlling microprocessor is loaded to a small extent.

This object is achieved in that the DMA unit in an inactive state featuring an interrupt mode is provided for transferring an interface control signal to the microprocessor by the control line and in an active state featuring a DMA mode is provided for forming at least one DMA control signal from the interface control signal and for transferring the formed DMA control signals to the microprocessor by the control line. For utilizing a serial interface for a data exchange both in the interrupt mode and in the DMA mode, the control line by which the interface is connected to the controlling microprocessor is looped through by a DMA unit. When a large number of data are to be transmitted via the interface, the communication system recognizes this and may activate the DMA unit by the microprocessor in a software-controlled manner. The DMA unit is then included in the control line and changes the interface control signals. The control signals directly transferred in the interrupt mode are interpreted and assigned to DMA control signals which are then applied to the microprocessor instead. This assignment may be simply realized by a switching circuit or an addressable memory and may thus be adapted to different requirements.

In a preferred embodiment, an evaluation unit in the microprocessor is coupled to the control line of the interface and provided for transferring to the microprocessor an interrupt vector assigned to the control line. Inside the microprocessor, the various control signals (for example I/O requests from a plurality of interfaces and further components of the communication system) are evaluated by an Interrupt Control Unit (ICU). The evaluation unit (ICU) produces an interrupt vector for each control line which vector is addressed by a control signal (interrupt on this control line). The interrupt vector points at an associated interrupt routine which the microprocessor then starts.

In an advantageous further embodiment, the DMA unit in the active state is provided for forming a DMA mode interrupt vector and for assigning the DMA mode interrupt vector to the control line of the interface in the evaluation unit. Besides the evaluation of the control signal by the interface, the DMA unit also produces a DMA mode interrupt vector which is used in the DMA mode instead of the normal interrupt vector. Since, according to the invention, one control line is used for two different interrupt sources (interface in the interrupt mode and DMA unit in the DMA mode), the interrupt vector assigned to the control line should be changeable to be able to distinguish it. In this manner, the DMA mode interrupt vector points at another interrupt routine which is started with a DMA control signal (DMA interrupt). In this manner, the DMA control signals (for example, occupancy levels of buffer memories in the DMA unit, transmission errors, data exchange terminated) may trigger suitable interrupt routines.

In a further embodiment of the invention, the DMA unit in the active state is provided for setting a DMA bit in the interrupt vector and in the inactive state for resetting the DMA bit in the interrupt vector. The formation of a DMA mode interrupt vector may be realized in an astonishingly simple manner by changing one bit in the interrupt vector. By setting the DMA bit (value '1'), physically the same vector continues to be assigned to the control line whereas, however, the contents are modified in an unambiguous manner so that the changed vector points at a new interrupt routine. When the DMA bit is reset by the DMA unit (value '0'), the normal interrupt vector is available again.

It is particularly advantageous to provide in the DMA unit in the active state a linear buffer and a ring buffer for buffering the data to be exchanged. Two storage methods are rendered available by the DMA unit for buffering data which are to be transmitted from or to the interface. In the linear buffer are buffered, more particularly rather small data sequences (for example, brief messages) because here the data are stored linearly at memory locations. In contrast, the ring buffer is organized in a ring-shaped manner, that is to say, when the top limit of the ring buffer is reached, the memory address is reset to its start value. This provides a buffer with an adjustable size. For avoiding an overflow or an emptying, the microprocessor receives DMA control signals about the occupancy levels. This ring buffer is particularly suitable for large data sequences which may occur, for example, when graphics data for featuring a display are transmitted.

In an advantageous further embodiment of the invention, the data exchange is optimized in that when data are buffered in the ring buffer, a respective DMA control signal featuring the occupancy level is transferred to the microprocessor when a half-full occupancy level and a full occupancy level of the ring buffer is reached, in that the number of the data still to be exchanged after each next occupancy level is written in a counter register of the linear buffer, and in that this number of the data is stored in the linear buffer when the next occupancy level is reached. In this manner, large data sequences may be buffered without loading the microprocessor. With conventional buffering, the microprocessor is constantly to query the memory addresses of the ring buffer to be able to stop the storage operation in the right manner because only the half-full and the full occupancy level is announced by means of control signals. With the method stated above, the DMA unit can autonomously monitor the buffering. When a data sequence (for example, 18 bytes) which does not exactly reach the half-full (for example 8 bytes) of full (for example 16 bytes) occupancy level of the ring buffer is to be buffered, the number of the data sequence that exceeds the next occupancy level (2 bytes in this example) is written in the counter register of the linear buffer. First the ring buffer is utilized to capacity for this purpose. The DMA unit then causes the number of data stored in the counter register to be stored in the linear buffer when the next occupancy level ('full' here) is reached, while the counter register is decremented by unity for each byte. The microprocessor is only loaded by a DMA control signal (DMA interrupt) at the end of the data exchange (counter register=0).

These and other aspects of the invention will be apparent from and elucidated with reference to the embodiments described hereinafter.

DETAILED DESCRIPTION OF THE INVENTION

Figure 1:
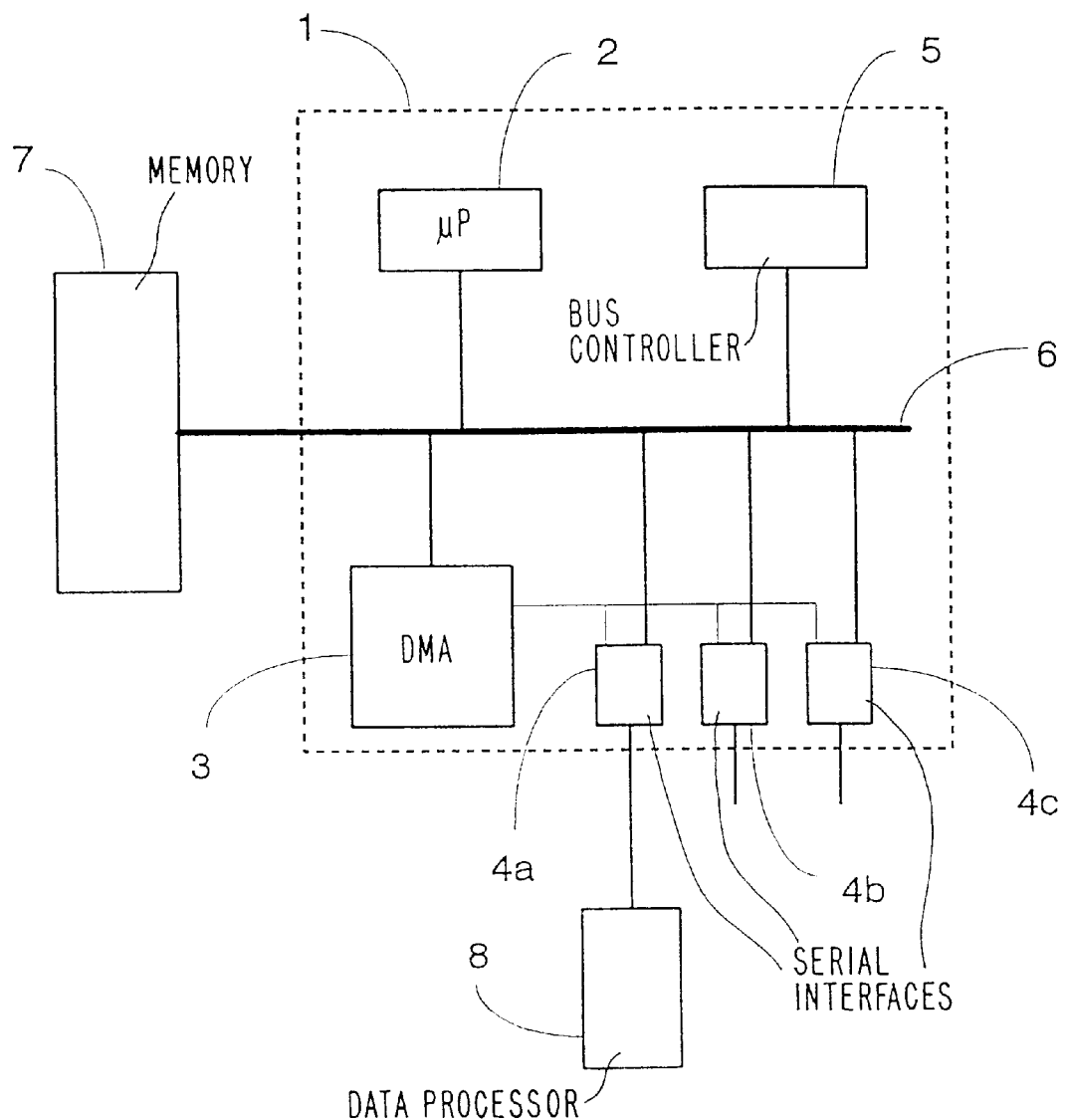
FIG. 1 shows a block diagram of the communication system.

The communication system 1 in FIG. 1 comprises a microprocessor 2, a DMA unit 3, a plurality of serial interfaces 4a, 4b and 4c and a bus controller 5 which are all connected to a bus 6. The memory 7 also coupled to the bus 6 is arranged outside the communication system 1 in the example of embodiment. The interfaces 4a–4c are further connected to the DMA unit 3 by a control line. Furthermore, a data processing arrangement 8 outside the communication system 1 by which the data exchange is effected is connected to the interface 4a. In the example, this data processing arrangement is a standard memory board in the PCMCIA format which is also used for PC applications. The communication system 1 is advantageously integrated in one chip.

Figure 2:
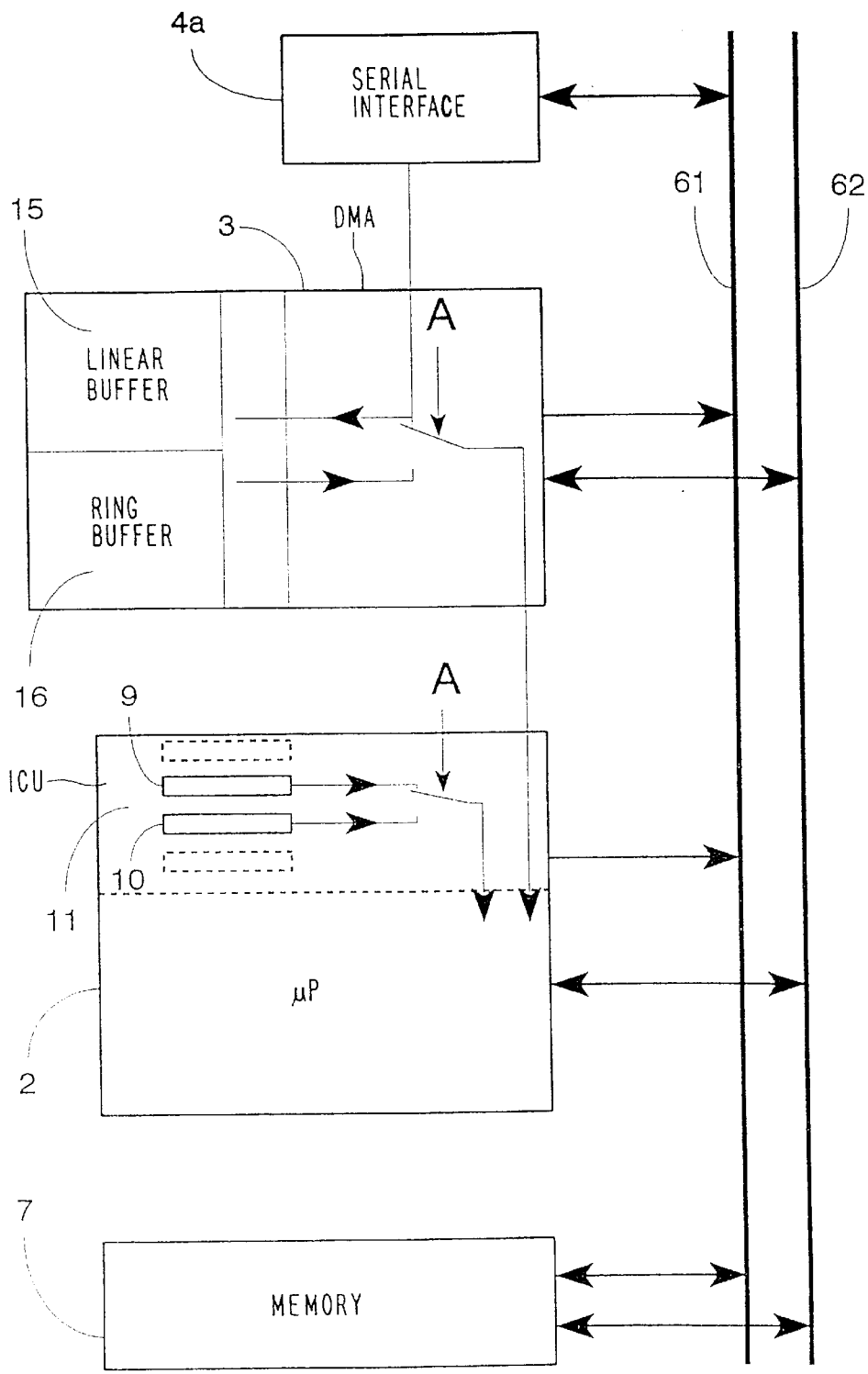
FIG. 2 shows a detailed block diagram of the data exchange with a DMA unit according to the invention.

For describing the data exchange by the DMA unit 3 according to the invention, the function blocks taking part therein are shown in more detail in FIG. 2. The bus 6 comprises a data bus 61 and an address bus 62. The DMA unit 3, the microprocessor 2 and the memory 7 are connected to the data bus 61 and the address bus 62. In addition, the serial interface 4a is coupled to the data bus 61. An evaluation unit 11 (Interrupt Control Unit ICU) assigned to the microprocessor 2 contains a plurality of interrupt vectors of which an interrupt vector 9 and an assigned DMA mode interrupt vector 10 are shown. Further is shown the control line by which the interface 4a is connected to the microprocessor 2 via the DMA unit 3. The DMA unit 3 renders a linear buffer 15 and a ring buffer 16 available.

Figure 3:
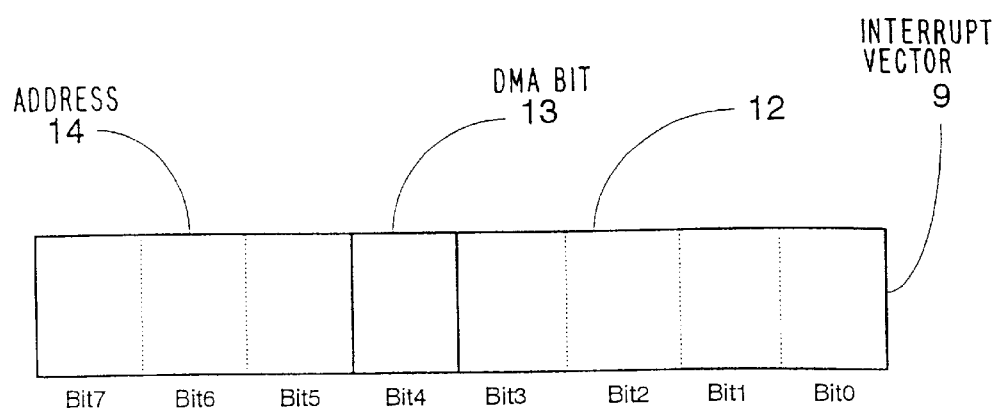
FIG. 3 shows the bit-by-bit structure of an interrupt vector for a microprocessor and FIG. 4 shows the structure of the buffer included in the DMA unit.

FIG. 3 shows the structure of an interrupt vector 9 in more detail. Generally, an interrupt vector 9 comprises three fields with a total of 8 bits of which the first four bits 12, starting from bit Bit0 (LSB), feature the interrupt source. The next bit Bit4 is the DMA bit 13 and the bits BitB5–B7 (MSB) describe a basic address 14. The basic address 14 is defined by a register (not shown) in the evaluation unit 11 and is the same for all the interrupt sources. The basic address 14 makes it possible for a plurality of vector tables to be used which contain the interrupt vectors 9 for all the interrupt sources. As a result, various interrupt routines are possible which are adapted to the software used, which software then writes a value for the vector table in the respective register. The interrupt vector 9 is multiplied by 4 in the core of the microprocessor 2 and the value obtained is used as a start address for the interrupt routine assigned to the interrupt source. For obtaining unambiguous start addresses, the basic address 14 is to be selected such that the interrupt vectors 9 from 0 to 64 ($2^4 \times 4$) are not involved.

The DMA bit 13 is set by the DMA unit 3. When an interface or another interrupt source cannot or must not be used in the DMA mode, the DMA bit 13 in the associated interrupt vector 9 is not set. Then, after a respective request from the interrupt source (control signal), the normal interrupt routine is started. For interrupt sources which can be used in the DMA mode, the DMA bit 13 forms the distinction between the normal interrupt routine and a DMA mode interrupt routine.

When the data exchange is to take place in the interrupt mode, the interface 4a announces a respective request (interrupt) to the microprocessor 2 by a control line. The control line is looped through by the DMA unit 3 which is in the inactive state, and the interface control signal is not changed by the request. The control signal is received and evaluated by the evaluation unit 11 (ICU) in which the interrupt vector 9 assigned to the interrupt source is transmitted to the core of the microprocessor 2. As a result, a start is made of the interrupt routine which controls a data exchange via the interface 4a in the interrupt mode.

Figure 4:
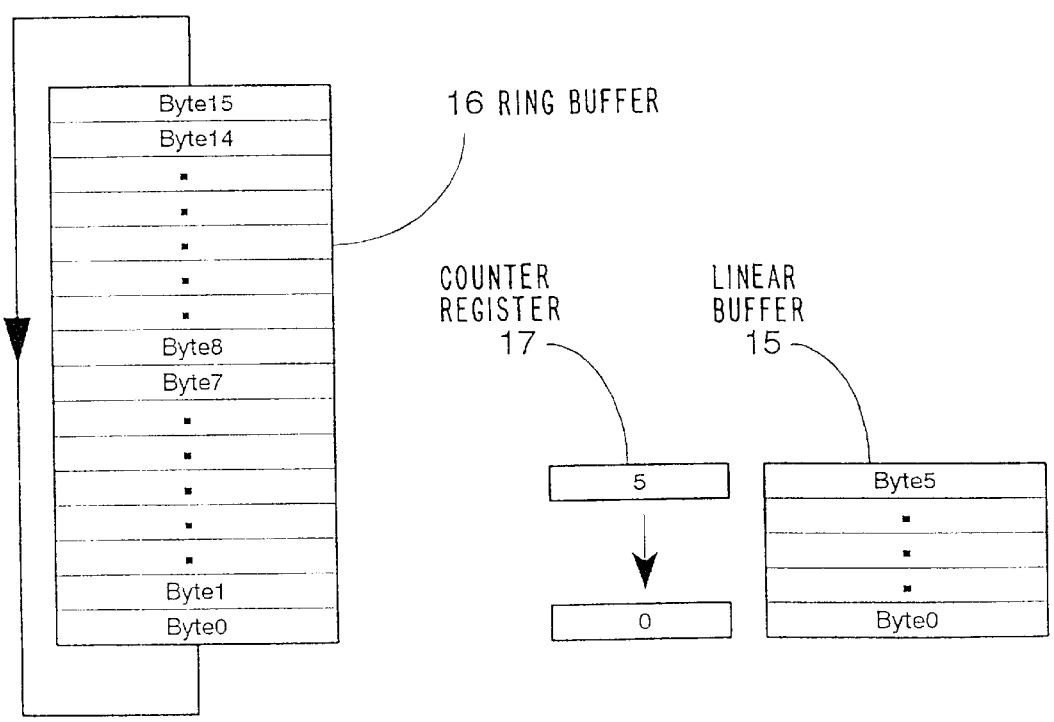

When, for example, on the basis of the type of data to be exchanged, the DMA mode is shown, the microprocessor 2 sets the DMA unit 3 to an active state featuring the DMA mode by means of an activation signal A. The control signals of the interface 4a are then no longer directly transferred to the microprocessor 2, but evaluated as data exchange requests in the DMA unit 3. The "free" control line is used for transmitting DMA control signals. In addition, in the active state, the buffers 15 and 16 rendered available by the DMA unit 3 are used for the data exchange in the DMA mode. The structure of the buffers 15 and 16 in the DMA unit 3 is shown in FIG. 4. Both message oriented and transparent data may thus be transmitted in optimum fashion by means of the DMA unit 3. In the case of message-related data, five bytes to be transmitted from or to the interface 4a may be buffered in the linear buffer 15. An assigned counter register 17 is decremented by unity for each stored byte and informs the microprocessor 2 that the buffer 15 is full when "zero" is reached. The exchange is automatically stopped when the set number of bytes to be transmitted is reached and the microprocessor 2 is also informed thereof by means of a DMA control signal. Transparent data to be transmitted are buffered in the ring buffer 16 which has selectable size. When a storage limit is reached, the memory address is again set to its start value. To avoid an overflow of the ring buffer 16, the microprocessor 2 is informed of the half-full and full occupancy levels by the DMA control signal.

To simplify the exact stop of the ring buffer 16 by the microprocessor 2 which is expensive as regards software, the DMA unit 3 takes over the synchronization. To stop the storage in the ring buffer 16 in a specific manner when not the "half-full" or "full" occupancy levels occur, the microprocessor 2 is generally to query the memory address of the ring memory 16 which leads to much load of the microprocessor 2 and of the bus 6. The DMA unit 3 according to the invention reduces the load considerably by a combination of the linear buffer 15 and the ring buffer 16. When the number of data still to be transmitted after the next "half-full" or "full" occupancy level has been reached is written in the counter register 17 during the storage in the ring buffer 16, the DMA unit 3 immediately switches to the linear buffer 15 when this next occupancy level is reached. The load of the microprocessor 2 is reduced to a DMA mode interrupt (counter register=0) at the end of the data exchange.

The DMA unit 3 reduces the circuitry and cost for the synchronization of the microprocessor 2 with the interface 4a by evaluating the control signals also in the following three cases. When a data exchange is started, a load of the microprocessor 2 is avoided until a start recognition in the DMA unit 3 recognizes the transmission of the first data word and this is announced to the microprocessor 2 via DMA mode interrupt. When, an error occurs during the data exchange, all the counters and pointers (for example, to the current address in the buffer 16) are frozen at their value. As a result, a very simple error treatment becomes possible when there is a renewed attempt at a data exchange.

In this manner, the microprocessor 2 is unloaded in the DMA mode because it no longer needs to react to every control signal (interrupt) from the interface 4a, but the control of the data exchange is largely taken over by the DMA unit 3. Since the same control line is now used for two interrupt sources (interface 4a in the interrupt mode and in the DMA mode), the associated interrupt vector 9 in the evaluation unit 11 of the microprocessor 2 as described above is to be equipped with an offset. As a result, the activating signal A also causes the DMA unit 3 to set the DMA bit 13. Thus, depending on the mode, two different interrupt routines are started in the case of an interrupt.

What is claimed is:

1. A communication system for exchanging data between a bus and at least one coupled data processing arrangement via a serial interface which is coupled to a DMA unit for selective connection of said serial interface and said DMA unit to a microprocessor by a control line between said DMA unit and said microprocessor, wherein the DMA unit, in an inactive state featuring an interrupt mode, transfers an interface control signal from the serial interface to the microprocessor by the control line; and wherein, in an active state featuring a DMA mode, the DMA forms at least one DMA control signal from the interface control signal and provides the at least one DMA control signals to the microprocessor by the control line.

2. A communication system as claimed in claim 1, characterized in that an evaluation unit in the microprocessor is coupled to the control line of the interface and provided for transferring to the microprocessor an interrupt vector assigned to the control line.

3. A communication system as claimed in claim 2, characterized in that the DMA unit in the active state is provided for forming a DMA mode interrupt vector and for assigning the DMA mode interrupt vector to the control line of the interface in the evaluation unit.

4. A communication system as claimed in claim 3, characterized in that the DMA unit in the active state is provided for setting a DMA bit in the interrupt vector and in the inactive state for resetting the DMA bit in the interrupt vector.

5. A communication system as claimed in claim 1, characterized in that in the DMA unit a linear buffer and a ring buffer in the active state are provided for buffering the data to be exchanged.

6. A communication system as claimed in claim 5, characterized in that when data are buffered in the linear buffer a DMA control signal featuring the end of the exchange operation is transferred to the microprocessor at the end of the data exchange.

7. A communication system as claimed in claim 6, characterized in that when data are buffered in the ring buffer a respective DMA control signal featuring the occupancy level is transferred to the microprocessor when a half-full occupancy level and a full occupancy level of the ring buffer is reached, in that the number of the data still to be exchanged after each next occupancy level is written in a counter register of the linear buffer, and in that this number of the data is stored in the linear buffer when the next occupancy level is reached.

8. A communication system as claimed in claim 1, characterized in that a start recognition for recognizing the first data to be exchanged is provided in the DMA unit in the active state and in that when the first data to be exchanged are recognized, the DMA unit is provided for producing a DMA control signal featuring the start of a data exchange.

9. A DMA unit for exchanging data between a memory and at least one coupled data processing arrangement via a serial interface, the serial interface being coupled to the DMA unit for selective connection of the serial interface and the DMA unit to a microprocessor by a control line between the DMA unit and the microprocessor, wherein the DMA unit, in an inactive state featuring an interrupt mode, transfers an interface control signal from the serial interface to the microprocessor by the control line; and wherein in an active state featuring a DMA mode, the DMA forms at least one DMA control signal from the interface control signal and provides the the at least one DMA control signals to the microprocessor by the control line.

10. A mobile radio comprising a communication system for exchanging data between a bus and at least one coupled data processing arrangement via a serial interface, wherein the serial interface is coupled to a DMA unit for selective connection of the serial interface and the DMA unit to a microprocessor by a control line, wherein the DMA unit, in an inactive state featuring an interrupt mode, transfers an interface control signal to the microprocessor by the control line; and wherein, in an active state featuring a DMA mode, the DMA forms at least one DMA control signal from the interface control signal and applies the at least one DMA control signal to the microprocessor by the control line.

11. A data processing unit comprising a communication system for exchanging data between a bus and at least one coupled data processing arrangement via a serial interface which is coupled to a DMA unit for selective connection of the serial interface and the DMA unit to a microprocessor by a control line, wherein the DMA unit, in an inactive state featuring an interrupt mode, transfers an interface control signal to the microprocessor by the control line; and wherein, in an active state featuring a DMA mode, the DMA forms at least one DMA control signal from the interface control signal and applies the the at least one DMA control signals to the microprocessor by the control line.

12. A communication system operating in an interrupt mode and a DMA mode comprising:

an interface unit for receiving data;

a DMA unit which is connected to said interface unit to receive said data from said interface unit; and a CPU which is connected to said DMA by a control line, wherein said DMA provides said data to said CPU over said control line in said interrupt mode, and forms DMA control data from said data in said DMA mode, said DMA providing said DMA control data to said CPU over said control line in said DMA mode.

* * * * *